United States Patent [19]

Kemp

[11] 4,072,126

[45] Feb. 7, 1978

[54] VISUAL INDICATOR FOR SAFETY SYSTEMS

[75] Inventor: Willard E. Kemp, Houston, Tex.

[73] Assignee: ACF Industries, Incorporated, New York, N.Y.

[21] Appl. No.: 705,746

[22] Filed: July 15, 1976

[51] Int. Cl.² ............................................. F16K 37/00
[52] U.S. Cl. ....................................... 116/125; 251/63
[58] Field of Search ...... 116/114 PV, 124 D, 114 AJ, 116/124 A, 114 AE, 114 R, 70, 125; 137/553, 556; 251/63

[56] References Cited

U.S. PATENT DOCUMENTS

| | | | |
|---|---|---|---|
| 1,999,493 | 4/1935 | White | 251/63 |
| 2,850,900 | 9/1958 | Billington | 116/114 R |
| 2,954,751 | 10/1960 | Barnes | 116/114 R |
| 3,181,496 | 5/1965 | Bilbrey | 116/70 |

Primary Examiner—S. Clement Swisher
Assistant Examiner—Denis E. Corr
Attorney, Agent, or Firm—Eugene N. Riddle

[57] ABSTRACT

A visual indicating device including a reflecting surface on one end thereof and a piston with an extendible and retractable indicator member attached thereto extending through the aperture. The extendible indicator member is colored and has a longitudinal bore in the outer end portion thereof. A transparent enclosure mounted on the housing encloses the reflected surface and is positioned in spaced relation therefrom to include a reflecting zone. A colored fixed indicator member secured to the enclosure extends in axial alignment with the extendible indicator member and is at least partially encloseable in the bore when the extendible indicator member is in an extended position. The fixed indicator member is colored in contrast to the extendible indicator member on the portion which is encloseable in the bore. In use, the reflective surface appears to have the same hue as the fixed indicator member colored end portion when the extendible indicator member is in a retracted position, and the reflective surface appears to have the same hue as the extendible indicator member when the extendible indicator member overlaps the fixed indicator member colored portion in an extended portion.

11 Claims, 7 Drawing Figures

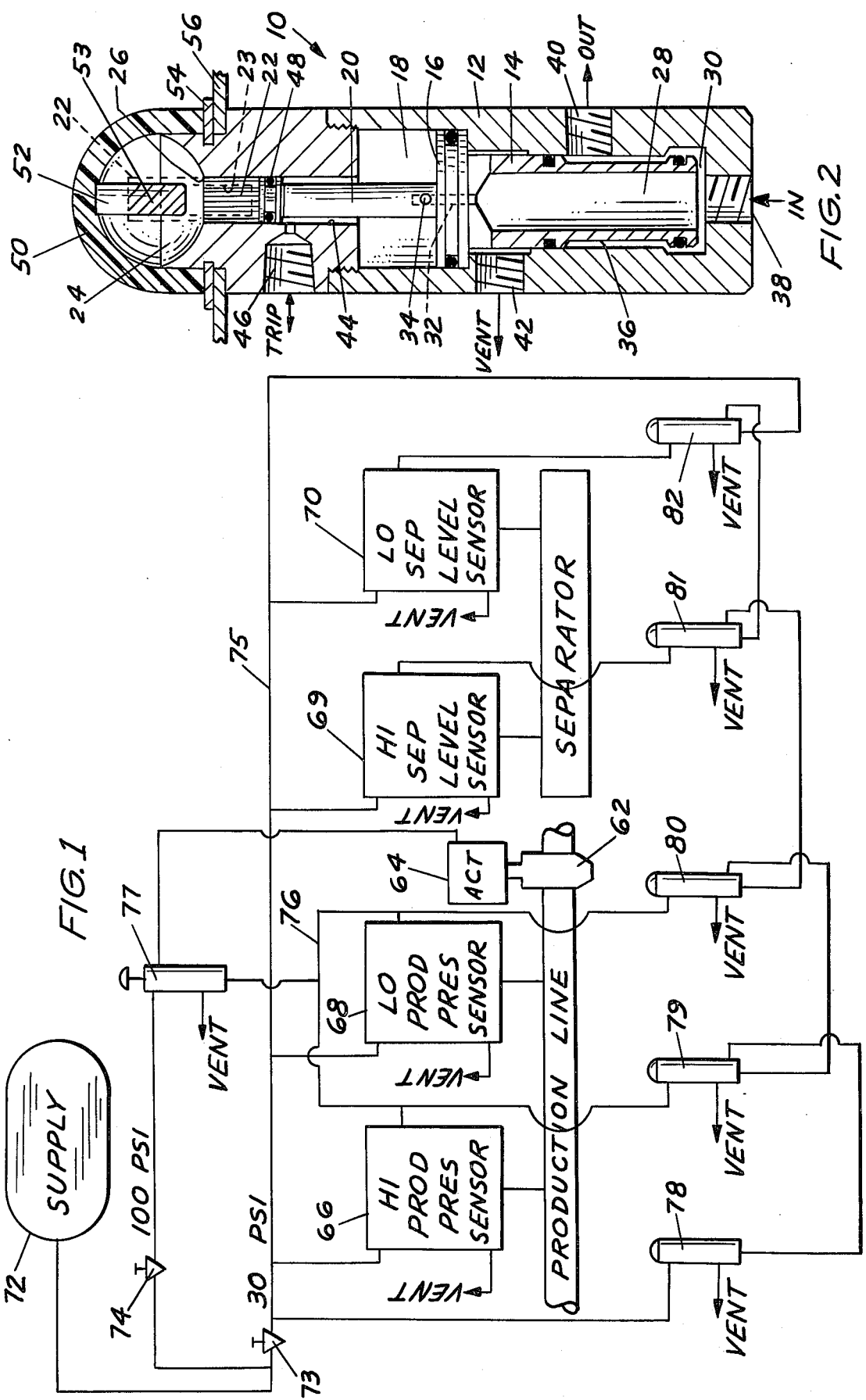

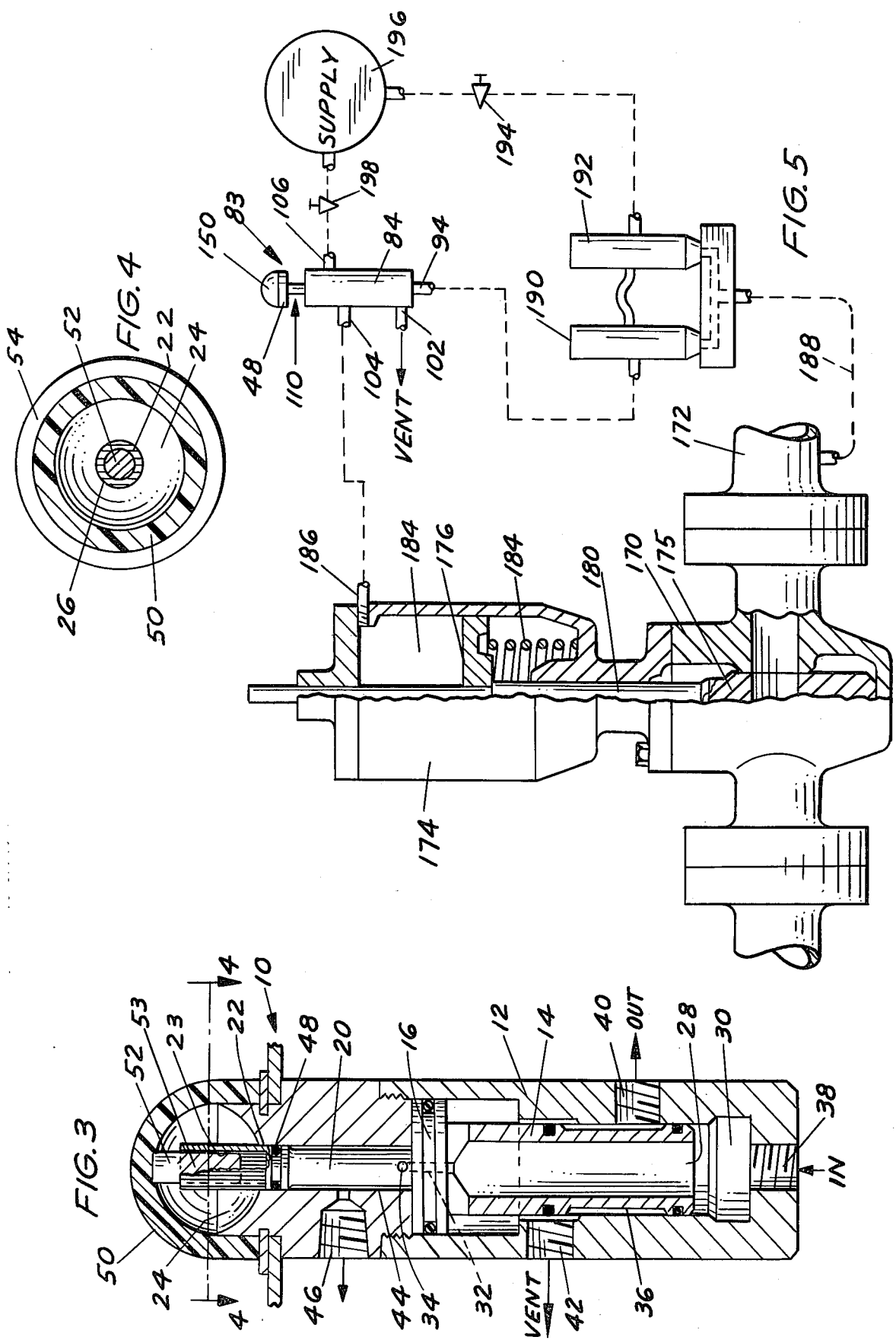

VISUAL INDICATOR FOR SAFETY SYSTEMS

BACKGROUND OF THE INVENTION

This invention is related to visual indicating devices of the fluid actuated type which displays one color for indicating a certain condition in an associated system and upon change of conditions in the system the device displays another color. Known similar devices in this art are constructed such that the change in the displayed color is subtle and the devices depend upon reflection of a relatively small colored surface area in one position or the other; thus the displayed colored indication can only change slightly from a neutral or gray scale hue to a color. One such device which is only an indicator is the subject of U.S. Pat. No. 3,181,496, wherein contrasting colors are employed on the end and the side of a plunger which extends into a reflective zone. This indicator can supply only a minimum of colored appearance when the plunger is retracted because only a small end of the plunger is visible. This particular construction of an indicator device provides only minimal color visibility with the plunger in the retracted position and a greater visibility with the plunger in an extended position exposing the larger colored area to the reflective zone.

SUMMARY OF THE INVENTION

An embodiment of the visual indicator structure comprising the present invention includes a housing with a reflective surface on the exterior and an extendible member movably mounted in the housing with an indicator member thereon extendible through the reflective surface. A convex transparent enclosure is mounted over the reflecting surface in spaced relation thereto enclosing a reflecting zone and supporting a fixed indicator member extending inwardly from the cover in an axial alignment with the movable indicator member. The movable indicator member has a longitudinal bore therein opening to its outer end so that the extendible member, when extended, will enclose at least a portion of the fixed indicator member. The fixed indicator member has its exterior brightly colored in contrast to the exterior of the extendible indicator member so that the indicator structure when viewed as a whole will provide a bright easily observable color when indicating either condition. In another embodiment, the indicator is combined with a fluid relay device for indicating the condition of a portion of a fluid system and operating as a relay.

One object of this invention is to provide a visual indicator overcoming the aforementioned disadvantages of the prior art devices.

Still, one other object of this invention is to provide a visual indicator which has an easily observable alternate color hue for indicating predetermined conditions in a system or the like.

Still, another object of this invention is to provide a visual indicator usable in safety systems where valves are controlled by means of fluid powered actuators and a visual indicator is combined with a relay or a control valve in a fluid system and functions as a visual indicator with the associated relay or control valve to indicate a predetermined condition in an associated system.

Various other objects, advantages, and features of this invention will become apparent to those skilled in the art from the following discussion, taken in conjunction with the accompanying drawings, in which:

DESCRIPTION OF THE DRAWINGS

FIG. 1 is a schematic diagram of a safety system including a production flowline and a separator employing a plurality of sensors and visual indicating devices of one embodiment of this invention.

FIG. 2 is a cross-sectional view of a fluid relay-visual indicator having the visual indicating device of the invention shown in the system of FIG. 1 with the extendible indicator member in the retracted position in solid lines and the extendible member shown in the extended position in dashed lines;

FIG. 3 is a cross-sectional view of the embodiment of the relay-visual indicator shown in FIG. 2 with the extendible indicator shown in the extended position covering the end portion of the fixed indicator member;

FIG. 4 is a cross-sectional view of the relay-visual indicator taken on line 4-4 of FIG. 3;

FIG. 5 is a partially schematic diagram of a valve, actuator, and control system therefor employing another embodiment of the visual indicator device of this invention in a control valve;

Figure 6:
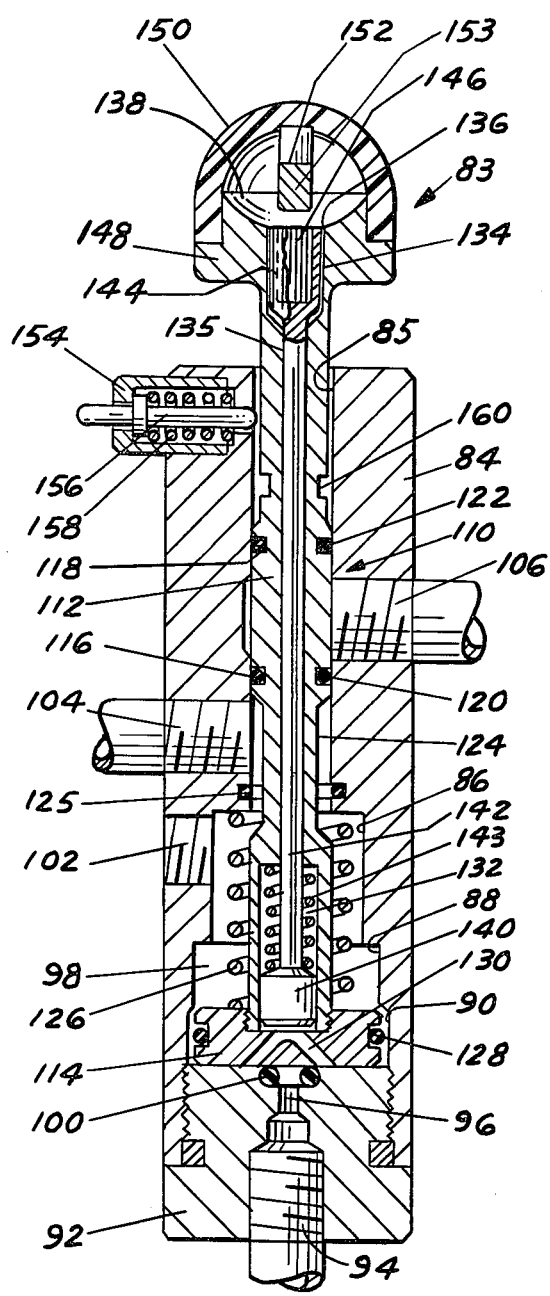
FIG. 6 is a cross-sectional view of the embodiment of the visual indicating device of this invention shown in the system of FIG. 5 and employed in a control valve having a movable slide valve member with the indicator mounted thereon and shown with the extendible indicator member in a retracted position.

The following is a discussion and description of preferred specific embodiments of the visual indicator of this invention, such being made with reference to the drawings, whereupon the same reference numerals are used to indicate the same or similar products and/or structure. It is to be understood that such discussion and description is not to unduly limit the scope of the invention.

DETAILED DESCRIPTION

In regard to application of the visual indicator of this invention, FIGS. 1 and 5 illustrate diagrammatically applications for the two structural embodiments of the indicator of this invention with a relay and with a control valve which are disclosed herein. Briefly, FIG. 1 illustrates an oil production line and separator system with high and low pressure production line sensors and high and low level sensors for the separator. A plurality of indicating relays incorporated with the indicator of this invention are placed at various points in the system to indicate a first out failure in the system. FIG. 5 illustrates a fluid actuated valve control system in a production flowline wherein the indicator of this invention is incorporated in a control valve connected to the high and low flowline pressure sensors and the actuator fluid supply. The systems illustrated in FIGS. 1 and 5 will be discussed in detail in the following.

FIGS. 2 and 3 show in cross section the relay-visual indicator of one embodiment of this invention incorporated in the system illustrated in FIG. 1, with the relay-visual indicator indicated generally at 10. Relay-visual indicator 10 is a fluid relay incorporating the indicating device of this invention on one end with the relay structurally serving as a means to move the indicator member between an extended position and a retracted position. Relay-visual indicator 10 has a hollow housing 12 enclosing a slide valve member 14 with a piston 16 secured to one end thereof and mounted in a piston chamber 18 in a central portion of the housing. Piston 16 has a larger cross-sectional area than slide valve member 14. A plunger 20 is secured to piston 18 on the side opposite to slide valve member 14. Plunger 20 has the extendible indicator member 22 on its outer end portion with a bore 23 therein. Housing 12 further includes a reflective surface 24 on one end thereof with an aperture 26 therethrough receiving extendible indicator member 22. Slide valve member 14 is hollow and has an internal valve chamber 28 open on the end opposite to piston 16 and opening into slide valve chamber 30. A vent passageway 32 through the closed end portion of relay internal valve chamber 28 and piston 16 communicates with the plunger side of piston 16. Vent 32 has an outlet 34 at the juncture of plunger 20 and piston 16. Vent 32 is functionally a flow restricting passageway communicably connecting piston chamber 18 and relay internal slide valve chamber 28. Relay slide valve member 14 has a reduced diameter center portion 36 with O-rings around the enlarged portions thereof adjacent to the reduced portion 36. An inlet 38 to slide valve chamber 30 is provided through the end of housing 12. An outlet from the relay slide valve is provided through the side of housing 12 at a point intermediate of reduced diameter portion 36 when slide valve member 14 is in the retracted position as shown in FIG. 2. A vent 42 for the slide valve is provided through the side of housing 12 at a point spaced from outlet 40 toward the center portion of the housing to provide for fluid communication with outlet 40 when the slide valve is positioned in the extended position as shown in FIG. 3. Plunger 20 is slidably mounted in bore 44 in housing 12. Bore 44 joins the reflective surface at aperture 26. Plunger 20 has an O-ring 48 mounted in an annular groove around its outer end portion at a point which will be outwardly beyond trip port 46 when slide valve 14 is in the retracted position as shown in FIG. 2. Plunger 20 has a reduced diameter portion between O-ring 48 and piston 16 so trip port 46 is in fluid communication with piston chamber 18. Fluid pressure applied through trip port 46 communicates with piston chamber 18, internal vent port 34, internal valve chamber 28 and relay valve chamber 30.

On the visually observable end of relay indicator device 10 a transparent enclosure or cover 50 is mounted over the end of housing 12 in spaced relation to reflective surface 24. Enclosure 50 has a convex exterior and a concave interior on its observable end portion and a generally cylindrical side wall which mounts over a generally cylindrical end portion of housing 12. Enclosure 50 can be thought of as substantially enclosing a reflective zone of the visual indicator. In the specific construction shown where reflective surface 24 is substantially parabolic, the reflective surface and enclosure 50 form a concavo-concave geometric figure enclosing the reflective zone. A fixed indicator member 52 is mounted on enclosure 50 extending inwardly from a center portion of the concave surface toward bore 23. Fixed indicator member 52 is sized substantially smaller than the bore 23 so that when extendible indicator member 22 is in the extended position as shown in FIGS. 2 and 3, it will enclose the unattached end portion of fixed indicator member 52. Supporting and mounting relay-indicator 10 can be done by securing housing 12 in a panel or the like. Housing 12 has a general cylindrical exterior on the observable end portion with a snap ring groove therearound to receive and mount snap ring 54. A radially disposed abutment on housing 12 is provided in a spaced relation to the snap ring groove. In mounted position the cylindrical portion of housing 12 between the radial abutment and the snap ring groove is positioned through an aperture in a panel 56 with snap ring 54 in the groove.

The end portion of extendible indicator member 22 defining bore 23 outwardly of O-ring 48 is preferably brightly colored on its exterior. The end portion 53 of fixed indicator member 52 is preferably brightly colored and contrasts to the color of extendible indicator member 22 at least on the portion thereof which is overlapped by extendible indicator member 22 when in the extended position. In regard to the choice of colors used on the indicator members, the specific choice is obviously at the discretion of the user. For example, it has been found desirable in industry to color end portion 53 of fixed indicator member 52 a bright green and to color the end portion of extendible indicator member 22 a bright red. FIGS. 2 and 3 show the indicator members with the fixed and movable indicator members shaded to represent red and green colors. With this selection of colors, the indicator device when viewed with the extendible indicator member 22 retracted appears to have a green hue which is indicative of a normal operating condition in some system utilizing the indicator. When this system has a failure, indicator member 22 is extended to cover the end portion 53 of fixed indicator member 52 and the visual indicator appears as having a red hue.

FIG. 1 shows an example of a system incorporating the relay-visual indicator device shown in FIGS. 2 and 3. The system illustrated diagrammatically in FIG. 1 represents an oil well production line connected to a separator which is typical of oil production equipment. Pressure monitoring is provided on the production line and level monitoring is provided on the separator. The production line has a valve 62 connected therein for controlling on and off oil production flow. Valve 62 is opened and closed by a pneumatically powered actuator 64. Pressure monitoring of the production line is done by a high pressure sensor 66 and a low pressure sensor 68 which are connected to the production line. Level monitoring of the separator is accomplished by a high level separator sensor 69 and a low level separator sensor 70. Operation of the pressure sensors requires a relatively low air pressure, typically on the order to 30 psi (pounds per square inch) (2.109 Kg/sq. cm) and operation of the valve actuator 64 requires a higher pressure, typically something on the order to 100 psi (7.030 Kg/sq. cm). In order to provide these different operating pressures, a high pressure pneumatic supply 72 such as compressed air or nitrogen is provided with a low pressure regulator 73 for providing the supply pressure for operation of the pressure sensors and a high pressure regulator 74 for providing a proper regulated pressure for operation of actuator 64. Each of the pressure sensors 66, 68, 69 and 70 is connected to a low pressure supply line 75 downstream of low pressure regulator 73. High level production pressure sensor 66 and low level production pressure sensor 68 are connected together by a line 76 to allow communication between them for proper cooperative operation. An actuator control valve 77 is connected to line 76, to the high pressure supply source through regulator 74, and to valve actuator 64. Control valve 77 communicates air from the high pressure source to actuator 64 for maintaining valve 62 in the open position so long as fluid pressure is applied through line 76 from the high and low pressure sensors 66 and 68. In the event either of the pressure sensors senses an abnormal condition they are tripped and vent pressure from line 76 to the atmosphere which in turn trips control valve 77 which allows control valve 77 to vent the air from the line connected to actuator 64 to the atmosphere thus closing valve 62.

A plurality of the relay-visual indicator devices 10, described above, are connected in the system shown in FIG. 1 and are designated by the numerals 78, 79, 80, 81, and 82. One relay-visual indicator device 78 is connected to the low pressure supply line 75 to provide an indication of the presence or absence of operating pressure in this line. The vent port of relay-indicator 78 exhausts to atmosphere, the outlet port thereof is blocked, and the inlet port thereof is connected to the next indicator in the system. Another relay-indicator 79 has its trip port connected to high pressure production line sensor 66 as shown, its outlet port connected to the inlet port of relay-visual indicator 78, and its inlet port connected to the next relay-visual indicator in the system. Another relay-visual indicator 80 has its trip port connected to low pressure production line sensor 68 as shown, its vent port exhausting to the atmosphere, its outlet port connected to the inlet of relay-visual indicator 79, and its inlet connected to the succeeding relay-visual indicator in this system. Another relay-visual indicator 81 has its trip port connected to high separator level sensor 69, its outlet port connectd to the inlet of relay-visual indicator 80, and its inlet connected to the last relay-visual indicator in this system. Another relay-visual indicator 81 has its trip port connected to high separator level sensor 69, its outlet port connected to the inlet of relay-visual indicator 80, and its inlet connected to the last shown relay-visual indicator in this system. The final relay-visual indicator 82 has its trip port connected to the low separator level sensor 70, its vent port exhausting to the atmosphere, its outlet port connected to the inlet of relay-indicator 81, and its inlet port connected to low pressure supply line 75. As clearly shown in FIG. 1, relay-visual indicators 79, 80, 81, and 82 will provide visual indication of the operating condition of the high and low production pressure sensors and the high and low separator level sensors respectively. Because of the manner in which the relay-visual indicators are connected in this system, they will provide a first-out indication of s system failure. Because a first out indication is given, then after a failure an operator can look at a control panel where the indicators are mounted and quickly identify the first pressure sensor to sense an abnormal condition in the system.

For example, if the high production pressure sensor 66 senses an abnormally high pressure in the production line, then pressure sensor 66 will vent the air from line 76 to the atmosphere through its vent and this causes two things to happen. First, and most importantly where the indicator is concerned, the pressure from the trip port of the relay-indicator device is vented and extendible indicator member 22 is moved outward exposing the red colored end thereof. Briefly, referring to FIGS. 2 and 3, the indicator is initially in the position as shown in FIG. 2 until the pressure is released through trip port 46, at which time pressure drops is piston chamber 18 and because line pressure is still supplied through inlet port 38, the pressure in relay valve chamber 30 urges relay slide valve member 14 upward from the position shown in FIG. 2 to the position shown in FIG. 3 and the red colored portion of the extendible indicator member is exposed giving the visual indicator a vivid red hue. The second thing to happen is that once relay slide valve member 14 is moved to the position shown in FIG. 3, flow from inlet 38 to outlet 40 or vent 42 is blocked and outlet port 40 is connected with vent 42 thereby venting the pressure in the line connecting outlet 40 with the inlet of relay-indicator 78. Because the inlet of relay-indicator 79 is blocked and its outlet is vented to the atmosphere, the pressure in the line connecting to the inlet of relay-indicator 79 is retained at substantially the prefailure pressure and the pressure at the inlet of relay-visual indicator 78 is vented, so all the relay-visual indicators except 79 remain in the position as shown in FIG. 2 with the green colored fixed indicator member exposed for view. When a failure like the one described above occurs, it is easy for an operator to view a panel where the relay-visual indicators are mounted and quickly determine that relay-visual indicator 79 was the first to indicate an abnormal condition in the system. In order to reactivate the system after some problem has been corrected control valve 77 is manually positioned to allow communication from the high pressure air source to actuator 64 which causes actuator to open valve 62 thus resuming normal pressure in the production line. When the normal production line pressure is resumed, pressure sensors 66 and 68 will apply air pressure from the low pressure source through line 76 to the pressure sensing port of control valve 77 at which time control valve 77 is automatically reset so that its continued open position is dependent upon pressure in line 76. Once the low pressure air is again supplied to line 76 piston 16 in the relay is moved downwardly from the position shown in FIG. 3 to the position shown in FIG. 2 so that green colored portion of the fixed indicator or member is again exposed to view. With the indicator of this invention combined with the relay as shown it is easy to see that the indicator provides for a rapid visual determination of the condition of the relay on a system which is in turn representative of the condition of or the position of other elements in the system.

Figure 7:
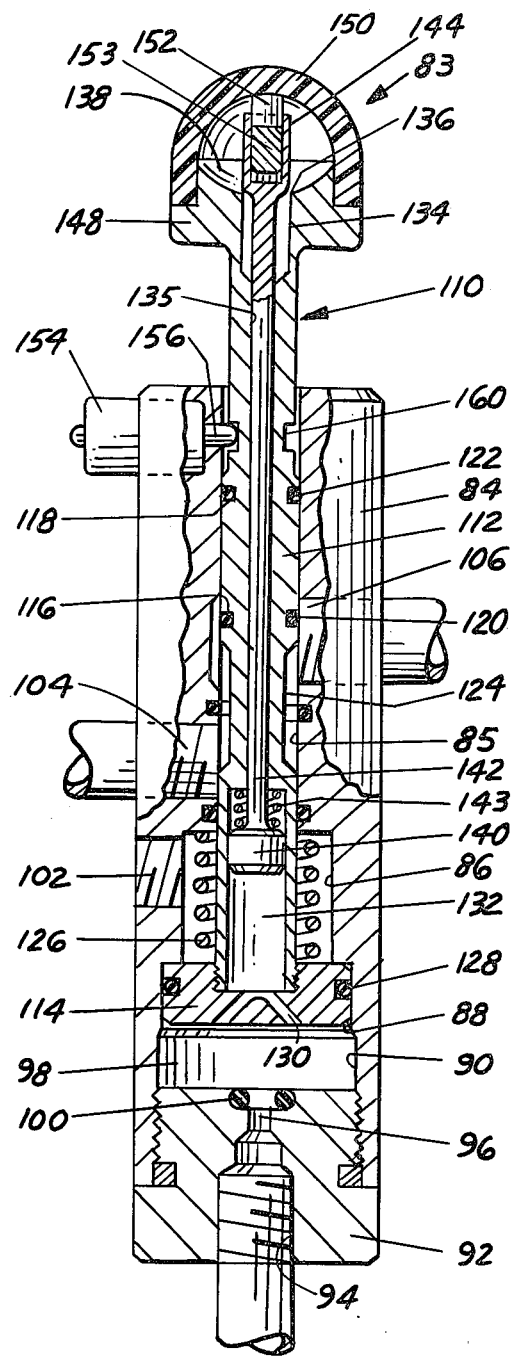
FIG. 7 is a cutaway view of the device shown in FIG. 6 with the extendible indicator member in the extended position and the control valve in a set position somewhat as it appears in a normal operating condition.

Another embodiment of the visual indicator of this invention is shown in detail in FIGS. 6 and 7 where the indicator is incorporated in a control valve. The control valvevisual indicator is illustrated in a system in FIG. 5. Referring to FIGS. 6 and 7, the control valve-visual indicator is indicated generally at 83 and includes a housing 84 forming a main body with a longitudinal bore therethrough forming an elongated slide valve chamber. The longitudinal bore has a small diameter bore portion 85 from one end to a midpoint of housing 84, an intermediate diameter bore portion 86 joining small bore portion 85, a larger diameter bore portion 88 joining intermediate bore portion 86 and another, the largest diameter, bore portion 90 joining bore portion 88 at the end of the slide valve chamber. A slide valve, indicated generally at 110, is mounted in the slide valve chamber. Housing 84 has an internally threaded end portion for threadedly mounting a housing end member 92. A pressure sensing port 94 is provided through the outer end of housing end member 92. A passageway 96 in the inner end of housing end 92 connects port 94 with the slide valve chamber. A piston chamber 98 is defined by bore portions 88 and 90. An annular seal ring 100 is provided at the juncture of passageway 96 and piston chamber 98. A vent port 102 is provided through intermediate bore 86 for venting piston chamber 98. An actuator connection port 104 through housing 84 joins small bore portion 85 in the vicinity of intermediate bore portion 86 and a pressure source port 106 through housing 84 joins small bore portion 85 at a point between actuator connection port 104 and the end of housing 12 which has slide member 110 extending therefrom.

Slide valve member 110 includes a small diameter portion 112 longitudinally slidably mounted in small bore portion 85 and threadedly attached to a piston 114 having an end face adapted to seal against seal ring 100. A pair of annular grooves 116 and 118 around a midportion of small diameter slide valve portion 112 receive and mount O-rings 120 and 122. These O-rings are placed on slide valve portion 112 such that when slide valve member 110 is in a retracted position as shown in FIG. 6, O-rings 120 and 122 seal against the small bore portion 84 on opposite sides of the pressure source port 106 with O-ring 120 being between ports 106 and 104. Slide valve small diameter portion 112 has a further reduced diameter portion 124 at a midportion thereof. The position of reduced diameter portion 124 is chosen so that when slide valve 110 is in a retracted position as shown in FIG. 6 then actuator connection port 104 is connected with piston chamber 98 and vent 102. An additional O-ring 125 is mounted in an annular groove in housing 84 around small bore portion 85 between vent port 102 and actuator connection port 104 to seal around slide valve 110 when it is in the extended position.

A helical spring 126 is positioned around slide valve small diameter portion 112 with one end of the spring abutting the end of intermediate bore 86 and the other end abutting the inner side of piston 114 to urge piston 114 toward housing end 92. Piston 114 is provided with a peripheral groove having an O-ring 128 therein. It is to be noted that piston 114 is sized so that O-ring 128 seals in bore portion 88 and is substantially smaller than the largest bore portion 90.

The extendible indicator member is movably mounted in the slide valve. A passageway consisting of at least one aperture 30 connects a peripheral portion of the outer side of piston 114 with the central portion thereof which joins the piston end of slide valve member 110.

Slide valve small diameter portion 112 is hollow through its entire length and includes a piston chamber 132 in the end portion thereof which is threadedly attached to piston 114. An open ended chamber 134 on its opposite end receives a portion of the extendible indicator member and a bore 135 connecting piston chamber 132 and chamber 134. Chamber 134 terminates at an aperture 136 which lies in the plane of reflective surface 138. The extendable indicator member includes a piston 140 located in piston chamber 132 at one end of slide valve member 110 and connected by a piston rod 142 through bore 135 to the observable end 144 of the indicator member located in open ended chamber 134. A helical spring 143 in piston chamber 132 around piston rod 142 urges piston 140 toward slide valve piston 114. The observable end portion 144 of extendible indicator member is a hollow open ended member secured to piston rod 142 and substantially enclosed within open ended chamber 134 when in the retracted position. Extendible indicator member end portion 144 has an internal bore 146 preferably coaxial with piston rod 142.

Extendible indicator member end portion 144 is substantially completely enclosed in chamber 134 when in the retracted position as shown in FIG. 6 and becomes visible when in the extended position as shown in FIG. 7. The exposed or outer end portion of slide valve member 110 is enlarged to provide a grip 148 for manually grasping slide valve member 110 and displacing it outwardly as is required in setting the control valve-visual indicator combination of this embodiment. A transparent cover member or enclosure 150 is mounted on grip 148 in spaced relation to reflective surface 138 and essentially enclosing a reflective zone on the end portion of the slide valve member. A fixed indicator member 152 is centrally mounted in and extends inwardly from cover member 150 in axial alignment with bore 146. With cover member 150 being a convex-concave shaped member and reflective surface 138 being parabolic, they define a substantially concavo-concave shaped reflecting zone. Although reflecting surface 138 is shown as being substantially parabolic it is to be understood that such can be flat, or inclined in a frustoconical shape, or shaped in some other form if desired so long as it has a shape and finish that will reflect and radiate a substantial amount of light from either the fixed indicator member of the extendible indicator member.

The extendible indicator member observable end portion 144 is preferably brightly colored, and the exterior of the fixed indicator member 152 is brightly colored in contrast to the color of the extendible indicator member. Fixed indicator member 152 is colored at least on end portion 153 thereof which in enclosed in bore 146 when the extendible indicator member is in the extended position as shown in FIG. 7. For example, it has been found desirable in the industry to color the extendible indicator member a bright shade of green and the fixed indicator member a bright shade of red. FIGS. 6 and 7 have the fixed and movable indicator members shaded to illustrate green and red colors respectively. With this color combination the green hue indicates a normal operating condition for many systems including the control valve-visual indicator 83. An abnormal operation for such a system, the green extendible indicator member will move into bore 146 and expose the red fixed indicator member to indicate an abnormal condition which is easily observable by an operator.

One additional feature of the control valve portion of the embodiment is a latch mounted on housing 84. The latch includes a latch housing 154 threadedly mounted in housing 84 essentially perpendicular to slide valve member 110 and enclosing a detent member 156. A spring 158 urges detent member 156 outwardly relative to slide valve portion 112 receives the inner end portion of detent 156. In use, detent 156 is pressed inwardly after slide valve member 110 is moved to its extended position by manually grasping grip 148 and pulling it outwardly relative to housing 84. In operation of a system using the control valve and indicator of this embodiment an operator grasps grip 148, pulls slide valve member 110 outwardly, presses the outer end of detent 156 within annular groove 160, and then releases grip 144. At this time spring 126 urges slide valve member 110 toward the retracted position and the innermost end of detent 156 is held in annular groove 160 by a wedging action of one side of groove 116 against the innermost end of detent 156. Once fluid pressure is applied to pressure sensing port 94 a sufficient amount to overcome spring 126 then slide valve member 110 is moved outwardly at least a small amount and detent 156 is released so the slide valve member assumes substantially the position shown in FIG. 7 with the detent displaced to the left or outwardly relative to slide valve member 110.

FIG. 5 illustrates a simple pneumatic actuator system and high-low pressure control system for controlling the operation of an actuated gate valve. This system is shown with the control valve-visual indicator 83 described above. A gate valve 170 is connected in a production flowline 172 carrying some fluid product. A fluid actuator 174 is mounted on the gate valve and connected to the gate member 175 thereof as shown. Actuator 174 includes a piston 176 secured to the gate valve stem 180 and movably mounted in a piston chamber 182. A spring 184 urges piston 176 toward the upper end of piston chamber 182 as shown which corresponds with moving the valve stem 180 and gate member 175 to the closed position. FIG. 5 shows gate valve 170 and actuator 174 in the open position. An actuator pressure supply line 186 connects actuator piston chamber 182 to actuator connection port 104 on control valve-visual indicator 83. A pressure sensing line 188 connects production flowline 172 to a manifold which mounts a high pressure level pressure sensor 190 and a low pressure level pressure sensor 192. Low pressure sensor 192 is connected by a supply line and through a low pressure regulator 104 to a fluid pressure supply 196. Appropriate cooperating communicating ports of the high pressure sensor 190 and low pressure sensor 192 are connected by a conduit. The high pressure sensor 190 is connected by a conduit to pressure sensing port 94 on control valve-indicator 83. The pressure source port 106 of the control valve-indicator 83 is connected by conduit through a high pressure regulator 198 to fluid pressure supply 196. The vent port 102 of control valve-indicator 83 is connected to a suitable exhaust vent or it is exhausted directly to the atmosphere when air is used as the powering fluid in the system. Functionally, control valve-indicator 83 controls the flow of the high pressure fluid used to displace piston 176 in actuator 174 against the force of spring 184. The pressure sensors 190 and 192 control the low pressure fluid used to actuate control valve 83, or in other words, the pressure used to release control valve 83 when fluid pressure in the production line 172 rises above or falls below its predetermined range of pressures. FIG. 5 shows the system with gate valve 170 in the open position. With the system in this condition, the control valve-indicator 80 is in the position illustrated in FIG. 7 and the green hue is shown by the visible portion of the indicator. When the pressure in the production line 172 drops below or raises above a predetermined and certain pressure, the appropriate pressure sensor senses an abnormal condition and vents the fluid from the line connected to control valve pressure sensing port 94 which in turn drops the pressure in control valve piston chamber 98 and allows piston 114 and slide valve 110 to move downwardly from the position shown in FIG. 7. Downward movement of piston 114 also lets extendible indicator member 142 move downwardly under the urging force of spring 143, thereby retracting the observable end of extendible indicator member 144 and exposing the red color of fixed indicator member 152. Upon downward motion of slide valve member 110 fluid pressure at the pressure sensing port 94 is blocked and fluid communication is provided between the actuator connection port and the vent so the quantity of fluid in the actuator piston chamber 182 is vented allowing quick closing of valve 170. Because of the highly visible nature of the indicator devices of this invention, it is particularly useful when mounted on control valve 83 because an operator can easily determine whether or not a system has the proper operating pressure by looking at the indicator. Because this embodiment of the indicator is on a control valve it provides a system condition indicator which can be on a panel in a control center or at some other point in the physical layout of the system. It is to be noted that the indicator members can be colored as desired by the user for any specific application. Regardless of the specific colors chosen for the indicator members the unique light reflection and color masking characteristics of the fixed and movable indicator members of this invention make this indicator highly desirable where positive indication of some condition is required.

While FIGS. 1 and 5 illustrate two possible systems in which the present invention may be employed it is apparent that this invention could be employed with various other systems. Also, while the specific embodiments shown in FIGS. 2 - 4 and in FIGS. 6 and 7 illustrate the fixed indicator member as being received within an end bore of the movable indicator member, it is to be understood that under certain conditions it may be desirable to have the fixed indicator member hollow to receive the movable indicator member within an end bore.

The indicator device of this invention is shown in two (2) specific embodiments where it is combined with a relay and a control valve. However, it is to be noted that if desired the indicator can be constructed with only a basic apparatus necessary to displace the extendible indicator member. Also it is to be noted that if desired the indicator can be constructed as disclosed herein with the indicator of this invention constructed as a part of some actuated device which is not a relay or a control valve.

As will become apparent from the foregoing description of the applicant's structure, a relatively inexpensive, simple, and novel visual indicating device has been provided. The structure is economical to manufacture, simple in operation and can be easily incorporated in fluid powered devices as well as other devices.

What is claimed is:

1. A visual indicator, comprising:
  (a) a housing having an exterior reflecting surface defining a reflecting zone, and an aperture through said housing located at said reflecting surface,
  (b) valve means mounted within said housing to control fluid flow between inlet, outlet, and exhaust valve ports and having a movable indicator member operably connected thereto, said indicator member positioned within the aperture and mounted for longitudinal movement between extended and retracted positions relative to the reflecting zone, and
  (c) a transparent generally cup-shaped enclosure mounted in an inverted relation over said reflecting surface in spaced relation thereto, said enclosure having an elongated fixed indicator member secured centrally to the inner surface thereof and extending inwardly therefrom in longitudinal axial alignment with the movable indicator member,
  (d) one of said indicator members being hollow and receiving the other indicator member in an overlapped relation when the movable indicator means is in an extended position outwardly of the reflecting surface, the movable indicator member being retracted from the overlapping position outwardly of the reflecting surface when the movable indicator means is in a retracted position, said movable indicator member and said fixed indicator member being of external contrasting colors at least for the lapped portions thereof, (e) said valve means maintaining under normal operating conditions the movable indicator means in its retracted position with said fixed indicator member only being in the reflecting zone, said valve means upon receipt of a signal from an associated system permitting movement of the movable indicator means to the extended position with said movable indicator member being in the reflecting zone and in said overlapped relation with said fixed indicator member.

2. A visual indicator as set forth in claim 1 wherein said movable indicator member is hollow and receives said fixed indicator member in said extended position.

3. A visual indicator as set forth in claim 1 wherein said valve means mounted within said housing comprises a slide valve having the movable indicator member on one end thereof and a piston adjacent the other end thereof, said housing having a chamber in which said piston is mounted for movement between said extended and retracted positions.

4. A visual indicator, comprising:
(a) a housing having an exterior reflecting surface defining a reflecting zone, and an aperture through said housing located at said reflecting surface,
(b) an extendible indicator member mounted in said housing having an outer end portion extendible through said aperture into said reflecting zone, said extendible indicator member having a longitudinal bore in said outer end portion with said bore opening to the outer end thereof,
(c) means in said housing to move said extendible indicator member between an extended position with said outer end portion located in said reflecting zone and a retracted position with said outer end portion substantially enclosed in said housing,
(d) a transparent enclosure mounted over said reflecting surface enclosing said reflecting zone and being in spaced relation thereto, and
(e) a fixed indicator member mounted in said enclosure extending inwardly therefrom in longitudinal axial alignment with said extendible indicator member and at least partially encloseable in said bore in overlapping relation upon movement of said extendible indicator member to said extended position,
(f) said extendible indicator member outer end portion being colored, said fixed indicator member being colored in contrast to said extendible indicator member outer end portion on at least the portion thereof which is overlapped by said extendible indicator member in the extended position,
(g) said means to move being operable, upon receipt of a signal from an associated system containing said visual indicator to move said extendible indicator member to said extended position for display of the color of said extendible member for visual indication of a predetermined condition of said system, said extendible indicator member in said retracted position permitting display of the color of said elongated indicator member for indication of another predetermined condition in said system, (h) said means to move said extendible indicator member having a piston chamber in said housing with a piston movably mounted therein, said piston having said extendible indicator member mounted adjacent one end thereof,
(i) said housing having one port therethrough communicating with said piston chamber at one end of said piston to in use permit fluid to enter said piston chamber for urging said extendible indicator member to said extended position and another port communicating with said piston chamber at the opposite end of said piston to in use permit fluid to enter said piston chamber for urging said extendible indicator member to said retracted position.

5. The visual indicator of claim 4, wherein:
(a) said fixed indicator member is brightly colored on the portion thereof which is encloseable in said bore, and
(b) said extendible indicator member is brightly colored and has a color contrasting to the bright color of said fixed indicator member.

6. The visual indicator of claim 4, wherein:
(a) said housing is a portion of a slide valve member of a control valve and said reflecting surface is exposed to view on a portion of a means to grasp said slide valve member on an exposed end portion of said slide valve member, and
(b) said means to grasp is manually displaced to set said control valve.

7. A visual indicating device, comprising:
(a) a housing having an outwardly flared reflective surface defining a reflective zone with an aperture through the convergent portion thereof,
(b) said housing having a longitudinal bore defining a piston chamber in a portion thereof, a valve member movably mounted in said bore and a piston in said piston chamber located at one end of said valve member, said valve member having an extendible indicator member mounted on the end thereof opposite said piston with the outer end portion thereof located in said aperture, said extendible indicator member having said outer end thereof being extendible from and retractable into said housing through said aperture, and said housing having a port therein communicating with said piston chamber at one end of said piston and another port communicating with the opposite end of said piston,
(c) said extendible indicator member having a longitudinally disposed bore in said outer end portion through the outer end thereof, said extendible indicator member outer end portion being a single color, and
(d) a transparent generally cup-shaped enclosure mounted in an inverted relation on said housing enclosing said reflective surface including said reflective zone and positioned in spaced relation therefrom, said transparent enclosure having an elongated colored fixed indicator member secured centrally to the inner surface thereof and extending inwardly therefrom in longitudinal axial alignment with said bore and at least partially encloseable in said bore when said extendible indicator member is in said extended position, said fixed indicator member being colored in contrast to said extendible indicator member on the portion thereof which is enclosed in said bore, (e) said reflective surface having the appearance of the same hue as said fixed indicator member colored portion when said extendible indicator member colored end portion is retracted and said reflective surface having the appearance of same hue as said extendible indicator member colored portion when said extendible indicator member is extended and overlapping said fixed indicator member colored portion.

8. The visual indicator of claim 7, wherein said colored portion of said fixed indicator member is colored red, and said colored portion of said extendible indicator member is colored green.

9. The visual indicator of claim 7, wherein said housing has a pair of valve ports communicating with said bore, said valve ports being placed relative to said valve member to permit fluid flow from one said valve port to the other said valve port upon positioning said valve member in an extended position and to prevent fluid flow from one said valve port to the other valve port upon positioning said valve member in a retracted position.

10. The visual indicator of claim 9 wherein said valve member is a slide valve member having said transparent enclosure on an end thereof extending from the housing, and said end is adapted to be gripped manually.

11. The visual indicator of claim 9, wherein said fixed indicator member is elongated and cylindrically shaped and said extendible indicator member is elongated and cylindrically shaped with said bore being substantially round in cross section.

* * * * *